United States Patent
Shadbolt et al.

(10) Patent No.: US 11,368,361 B2
(45) Date of Patent: Jun. 21, 2022

(54) TAMPER-RESISTANT SERVICE MANAGEMENT FOR ENTERPRISE SYSTEMS

(71) Applicant: MICROSOFT TECHNOLOGY LICENSING, LLC, Redmond, WA (US)

(72) Inventors: Matthew Ronald Shadbolt, Redmond, WA (US); Michael Joseph Healy, Duvall, WA (US); Shweta Jha, Issaquah, WA (US); Gokhan Ozhan, Redmond, WA (US); Adrian Mihail Marinescu, Sammamish, WA (US); Alemeshet Yismaw Alemu, Redmond, WA (US); Karthik Selvaraj, Redmond, WA (US); Milind Amrutrao Pawar, Sammamish, WA (US); Vladimir Soroka, Redmond, WA (US); Hayk Hovsepyan, Redmond, WA (US); Chaohong Ou, Bellevue, WA (US); Patanjal Digant Vyas, Bothell, WA (US); David Torosyan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/893,901

(22) Filed: Jun. 5, 2020

(65) Prior Publication Data
US 2021/0385129 A1  Dec. 9, 2021

(51) Int. Cl.
*H04L 41/0803* (2022.01)
*H04L 9/08* (2006.01)
*H04L 9/40* (2022.01)

(52) U.S. Cl.
CPC ........ *H04L 41/0803* (2013.01); *H04L 9/0825* (2013.01); *H04L 63/0876* (2013.01); *H04L 63/205* (2013.01)

(58) Field of Classification Search
CPC ........ G06F 21/12; G06F 21/121; G06F 21/30; H04L 41/08; H04L 41/0803; H04L 63/20;
(Continued)

(56) References Cited

U.S. PATENT DOCUMENTS 7,181,531 B2    2/2007  Pinkerton et al.
7,757,276 B1 *  7/2010  Lear ..................... G06F 21/572
                                                          726/6
(Continued)

OTHER PUBLICATIONS

Dhiman, et al., "Defender CSP", Retrieved from: https://docs.microsoft.com/en-us/windows/client-management/mdm/defender-csp, Oct. 21, 2019, 13 Pages.

*Primary Examiner* — Jeong S Park
(74) *Attorney, Agent, or Firm* — NovoTechIP International PLLC

(57) ABSTRACT

A system and method for providing stringent tamper resistant protection against changes to key system security features. The tamper protection is configured such that any changes to the policy can only occur from a configuration manager console, thereby preventing local device admin users or other malicious actors from altering the setting. Thus, tamper protection locks the selected service and prevents security settings from being changed through third-party apps and methods. When a system administrator enables the feature for an enterprise's workstations, only administrators will be able to change the service settings across a company's computers. The tamper protection policy is digitally signed in the backend before being deployed to endpoints, and the endpoint verifies the validity and intent of the policy, establishing that it is a signed
(Continued)

package that only security operations personnel with the necessary administrator rights can control.

20 Claims, 11 Drawing Sheets

(58) Field of Classification Search
CPC .. H04L 9/0825; H04L 63/0876; H04L 63/205
See application file for complete search history.

(56) References Cited

U.S. PATENT DOCUMENTS

| | | | |
|---|---|---|---|
| 8,627,475 | B2 | 1/2014 | Loveland et al. |
| 2007/0240217 | A1* | 10/2007 | Tuvell .................. G06F 21/565 |
| | | | 726/24 |
| 2008/0005188 | A1 | 1/2008 | Li et al. |
| 2008/0218309 | A1* | 9/2008 | Steenstra .............. H04W 8/245 |
| | | | 340/5.8 |
| 2013/0160126 | A1 | 6/2013 | Kapoor et al. |
| 2014/0019617 | A1* | 1/2014 | Hadar ..................... H04L 63/20 |
| | | | 709/225 |
| 2017/0223230 | A1* | 8/2017 | Bunker ................ H04N 1/4426 |
| 2017/0250899 | A1* | 8/2017 | Chan ....................... H04L 67/16 |
| 2018/0341529 | A1 | 11/2018 | Kou et al. |
| 2019/0182295 | A1 | 6/2019 | Pulapaka et al. |

\* cited by examiner

TAMPER-RESISTANT SERVICE MANAGEMENT FOR ENTERPRISE SYSTEMS

BACKGROUND

To perform computing tasks, computer systems run software. Software is continually evolving to include updated functionality, for example, to correct bugs, address security issues, add features, and simply to provide additional or enhanced features. With respect to enterprise computing systems comprising a large number of individual client computing devices, the management of software installations or other software components can be difficult to monitor, as well as time-consuming. Furthermore, as more and more computers have become interconnected through various networks, attacks delivered over a network have also increased, and integrity of enterprise computing systems is of utmost significance. Such malware attacks can occur in the form of computer viruses, computer worms, ransomware, system component replacements, spyware, adware, denial of service attacks, and other invasive attacks that exploit one or more computer system vulnerabilities for illegitimate purposes.

Software files are increasingly the target of different types of malware, such as file infectors that modify the system files to subvert the system behavior. These files are used to maintain system state and are an important manifestation of data for consumers and enterprises. Furthermore, operating systems also rely on configuration files, such as hosts, group policy settings, system service configuration files, and other files that can be targeted by malicious applications or modified by end-users.

A network security administrator may be required to identify a number of settings that should be applied across some or all of the enterprise's computing devices, seeking to ensure consistent protection across the network. However, software configuration settings remain vulnerable to modifications by end-users and/or malicious apps, leading to devices being exposed to undesirable elements that can result in reduced system stability or security. Thus, there remain significant areas for new and improved ideas for managing configurations across an enterprise in a way that reduces the burden on end-users and network administrators, while ensuring that necessary settings as established by the administrator remain unchanged by end-users or other unauthorized actors.

SUMMARY

A method of deploying a tamper protection policy modification, in accordance with a first aspect of this disclosure, the method including receiving, at a target device, a configuration command comprising a first policy modification for a first policy. The method may also include changing the first policy at the target device according to the first policy modification. The method may further include authenticating, by the target device, the first policy modification based on a digital signature for the first policy modification, the digital signature being included in the configuration command. In addition, the method may include activating, at the target device, a protected state for the first policy in response to the authentication, the protected state ensuring the first policy is not modified in response to an unsigned modification request.

A method of deploying a tamper protection policy modification, in accordance with a second aspect of this disclosure, the method including receiving a user request for modifying a policy of at least a first target device. The method may also include obtaining a bit string encoding a policy modification and obtaining a digital signature generated for the bit string. The method may further include encoding the bit string and digital signature in a configuration command for the first target device, the configuration command instructing the first target device to modify the policy and protect the modified policy from unsigned modification requests. In addition, the method may include issuing the configuration command to the first target device.

A system, in accordance with a third aspect of this disclosure, includes a processor and a machine-readable medium storing instructions therein which, when executed by the processor, cause the system to receive a user request for modifying a policy of at least a first target device. The instructions may also cause the system to obtain a bit string encoding a policy modification and obtain a digital signature generated for the bit string. Furthermore, the instructions may cause the system to encode the bit string and digital signature in a configuration command for the first target device, the configuration command instructing the first target device to modify the policy and protect the modified policy from unsigned modification requests. The instructions may also cause the system to issue the configuration command to the first target device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
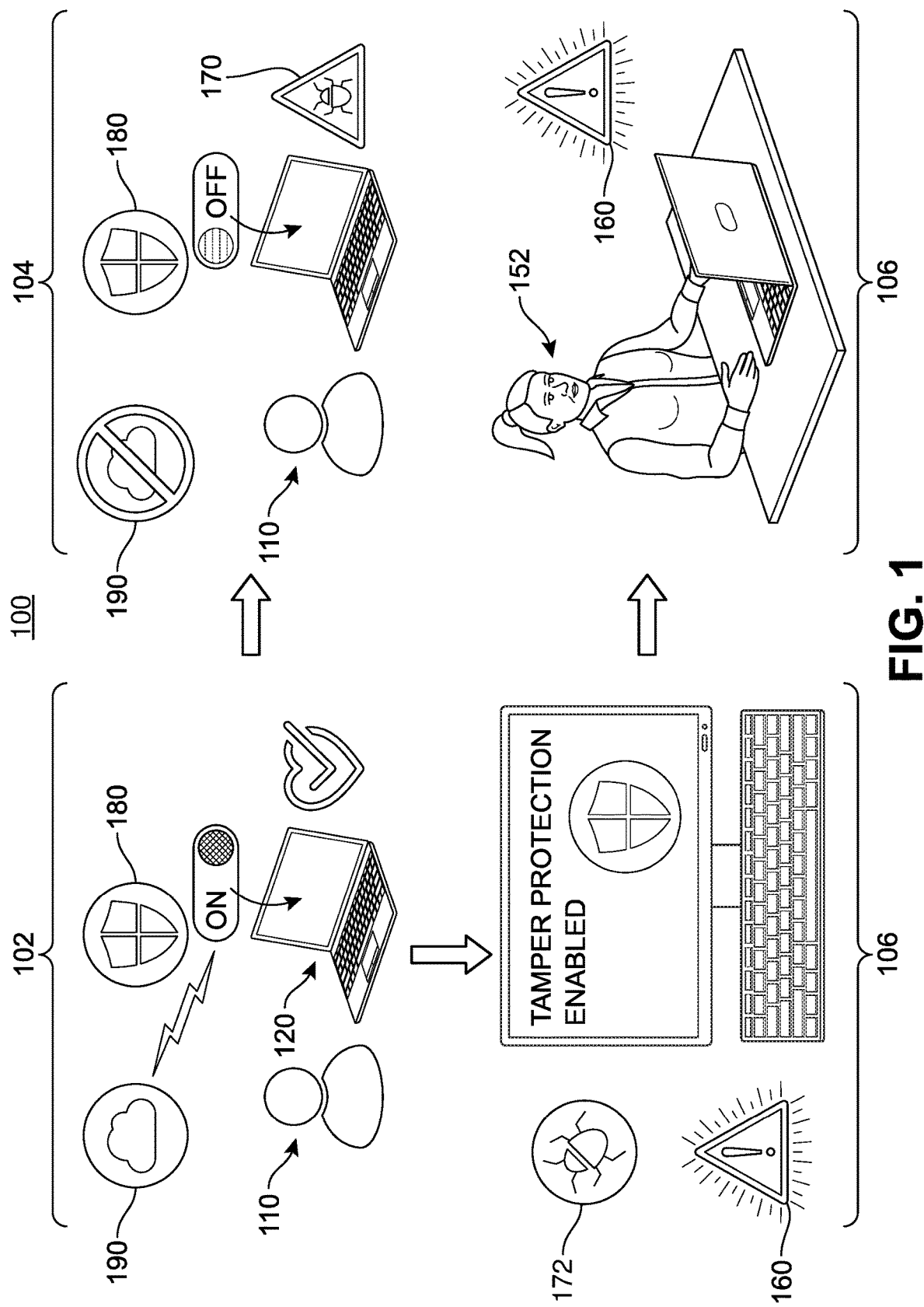
FIG. 1 is a conceptual illustration of an implementation of a system compromised by modifications to a policy as contrasted to a system in which the policy is locked by tamper protection.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following description discloses systems and methods for protecting and unauthorized changes to system configuration settings. As will be described in detail below, the proposed systems and methods offer a robust tamper protection paradigm for maintaining the desired security of client devices and systems. The tamper protection feature disclosed herein is configured to prevent malicious or other unwanted changes to security settings on devices, such as unauthorized attempts to disable security protection features, by limiting access to the tamper protection feature. For example, in one implementation, changes in management and deployment of the desired tamper protection state may only be made through a designated cloud-based enterprise mobility management tool (MMT), rather than conventional methods such as group policies, registry keys, PowerShell cmdlets, or WMI. When a security administrator enables the tamper protection feature, the policy is first digitally signed. The receiving endpoint verifies the validity and intent of the policy, establishing that it is a signed package that only security operations personnel with the necessary admin rights can control. The feature can be enabled or disabled for the entire organization, or enabled or disabled on selected devices identified through mechanisms such as device and user groups. A wide range of services and settings can then be protected from undesired modification, including virus and threat protection, real-time protection, behavior monitoring, antivirus, cloud-delivered protection, and/or security intelligence updates. The tamper protection feature provides an enterprise-wide shield that blocks attempts by malicious applications, as well as by day-to-day end-users (including, for example, end-users with local administrative privileges), to alter critical settings.

For purposes of reference, the terms "cloud computing service" or "cloud service" generally refers to one or more computing resources provided over a computer network such as the Internet by a remote computing facility. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Furthermore, the terms "software program", "software application", "program", "software", or "application" may be understood refer to a computer program that performs useful work, generally unrelated to the computer itself. Some non-limiting examples of software applications include word processors, spreadsheets, accounting systems, and telecommunication programs, as well as gaming software, utility and productivity tools, mobile applications, presentation graphics, and other productivity software. Specific references to a software application by name throughout this description should not therefore be understood to limit the use of the proposed systems and methods. In addition, synchronization can refer to an automated process by which one or more policy settings are updated by an MMT or other management channel.

In addition, as a general matter, malware refers to software that has been designed specifically to damage or disrupt a system (e.g., malicious software or "malware"), and compromises the integrity of the computer's operating system. On a day-to-day basis, operating systems are designed to provide infrastructure for hosting processes and providing system services to those processes. These operating systems usually provide basic security protections, including enforcement of access control and ownership rights over system resources. Some typical protective security services come in the form of a host firewall, vulnerability assessment, patch detection, behavioral blocking, host or network intrusion detection, and antivirus technologies. These services may be run as native applications in the operating system.

In other words, protecting a computer system and its operating system from such damage involves installation of security applications, such as antivirus software, personal firewalls, and intrusion detection systems. Even in systems that comprise multiple computer systems, such as a computer network or a cluster of computer systems deployed in an array, each individual computer system may run its own set of security applications. Generally, this is due to each computer system in the network or array being a physically separate entity with its own network attachment, its own central processing unit(s), its own instance of an operating system, and its own instances of applications. These security applications may be installed on each computer system with the aim of preventing the device and its operating system from being compromised. However, such security applications may fail to protect the computer system as well, in part because—like the other applications running on the computer system—they may also be vulnerable to attack. For example, unauthorized users and/or malicious codes or other malware may attack a computer system and gain a requisite level of control (e.g., administrator-level access) by altering configuration settings at one or more devices, thereby exposing the devices to further exploitation.

Figure 2:
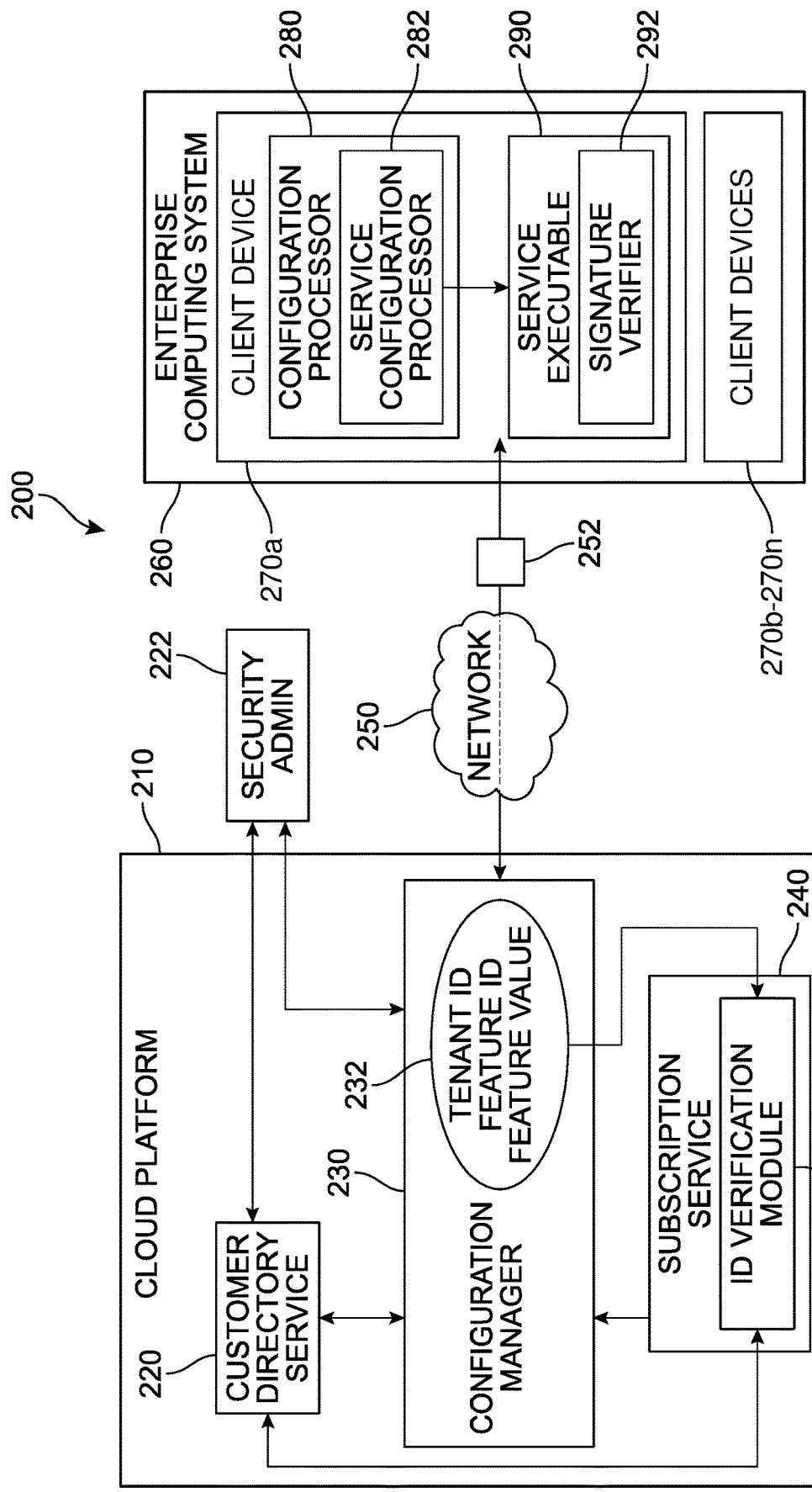
FIG. 2 is a diagram illustrating an implementation of a tamper protection system architecture.

In order to better introduce the systems and methods to the reader, FIG. 1 presents a high-level example of a representative computing environment ("environment") process flow 100 for implementing a tamper protection system ("system"), which will also be illustrated schematically in FIG. 2. In different implementations, the environment 100 can include one or more computing device end-users, or simply "users". One or more users can interact with or manipulate data presented via one or more user devices (which may be referred to as "client computing devices" or "client devices"). The various features and activities illustrated in FIG. 1 are described generally, with further details and examples presented in connection with later figures.

As an example, a first actor 110 is accessing or otherwise interacting with registry settings via a first device 120. The first actor 110 can refer to a device end-user, a local administrator for the first device 120, and/or a malicious application attempting to gain access to the first device 120. The first device 120 may be a personal computer such as a desktop or laptop computer, a mobile device, or any other computer system. The first device 120 executes an operating system such as Microsoft Windows®, Mac OS®, Unix®, or other operating system, and includes memory, storage, a network interface, and other computer hardware not illustrated in FIG. 1 for clarity. Furthermore, the first device 120 can be connected to a server, or an online or cloud-based management service ("cloud management service") 190 that may be configured to centrally administer and/or manage policy configuration requests from various policy sources. A configuration request may also be referred to as a "configuration command."

As noted earlier, one example of a critical policy configuration includes configuration settings affecting the deployment and operation of an anti-virus protection (AVP) system 180. In different implementations, AVP system 180 can be deployed as a cloud service, non-cloud applications (such as at local devices), or a combination of both. The AVP system 180 generally includes one or more computers and storage to store anti-virus detection information (e.g., malware detection metadata) and executable code in some examples. In some examples, the AVP system 180 may be provided to one or more endpoint devices via a computer network. The AVP system 180 may be configured to operate using an anti-virus service that prevents, detects, and/or remediates system abuse by malware. Some or all of the AVP system 180 or the functionality of the AVP system 180 for an end-user computing device can be implemented within the end-user computing device. For example, interceptions of certain operations may be performed by the end-user computing device. In some examples, the malware detection metadata can include signatures, heuristics, data to drive emulation, dynamic translation, cloud queries, and/or machine learning-based techniques (such as, but not limited to, machine data learning models, behavioral analysis, etc.). In some implementations, the functionality of the AVP system 180 is performed, within a protected environment that is isolated from the operating system (for example, using virtualization-based security techniques). In one implementation, AVP system 180 is configured to perform automatic remediation of a generic class of malware which in one example modifies data or files belonging to the operating system. For example, malware detection metadata defines a list of system binary files and configuration files targeted by malware.

In a first stage 102 of FIG. 1, the AVP system 180 associated with first device 120 is enabled and performing normally. However, as noted above, in conventional computing environments, threat actors can attack devices by reconfiguration of settings via the device registry editor or other group policy settings. This is depicted at a second stage 104, where first actor 110 has disabled the AVP system 180, and disrupted oversight associated with cloud management service 190. Such a modification is configuration settings can lead to first device 120 becoming vulnerable to attacks caused by, for example, malware 170.

In contrast, in computing environments where an implementation of the proposed systems is employed, when first actor 110 attempts to modify configuration settings to disable or otherwise tamper with the AVP system 180 configuration set by the cloud management service 190 results in the AVP system 180 blocking the action. As shown in an alternate third stage 106, the first device 120 prevents the first actor 110 from performing the modification. In some implementations, the first device 120 is configured to detect such attempts at modifying configuration settings, and upon detection of this attempt to modify the configurations towards disabling the AVP system 180, an alert 160 can be issued which may be conveyed to a security administrator 152 in a fourth stage 108 for review and follow-up.

In order to provide further context for the uses and applications of the systems described herein, FIG. 2 presents a non-limiting example of a tamper protection system ("system") 200. In this example, the system 200 includes cloud-hosted service platform ("cloud platform") 210 in communication with an enterprise computing system architecture ("enterprise architecture") 260 via a network 250. While the disclosed process and system can be applicable to enterprise environments, which typically include network administrators and other information technology workers, it can be appreciated that the proposed systems and methods may also be implemented by individual or small group consumer-level entities that are frequently the targets of malware attacks on their personal computing devices.

The network 250 may be any type of communications link capable of facilitating communications between client devices 270a-270n included in the enterprise architecture 260 and the cloud platform 210, utilizing any type of communications protocol and in any configuration, such as without limitation, a wired network, wireless network, or combination thereof. In some implementations, cloud platform 210 refers to a cloud computing service for building, testing, deploying, and managing applications and services. It can provide software as a service (SaaS), platform as a service (PaaS), and infrastructure as a service (IaaS), and supports many different programming languages, tools, and frameworks, including either or both Microsoft™-specific and third-party software and systems. Some types of cloud platforms that may implement the proposed system can include, but are not limited to, Microsoft AZURE™, Amazon Web Services (AWS)™, Google Cloud Platform™ or Firebase™, IBM™ Cloud Computing, Oracle™ Cloud, SAP Cloud Platform, Salesforce™ App Cloud, and Heroku™.

As shown in the example of FIG. 2, the cloud platform 210 further includes or is otherwise connected to one or more device configuration management servers ("configuration manager") 230. In different implementations, the configuration manager 230 can include mobile operator management server(s), enterprise configuration manager(s), or a combination thereof. Examples of an enterprise configuration manager include a messaging server, a mobile device management (MDM) server or protocol, a document server, and so forth. An MDM server can administer the mobile device(s) (e.g., one or more or the client devices 270a-270n) by control and protection of data and configuration settings on the mobile device using network-based distribution of applications, data, and policy configuration requests. The MDM server can send policy configuration command(s) to the client device 270a when the client device 270a is enrolled with the MDM server. In some implementations, the configuration manager 230 is configured to utilize an Open Mobile Alliance Device Management (OMA-DM) server and/or protocol for distribution of configuration commands.

In different implementations, the configuration manager 230 centrally manages the policy configuration requests from the various policy sources for the client device 270a. It is contemplated that the configuration manager 230 can centrally manage policy values for policies maintained in policy stores delegated to other component(s) present or in hardware on the client device 270a. For instance, some policies may be managed and attested in hardware of the client device 270a. The configuration manager 230 can be split into two components that delegate tasks to each other, for example. According to yet another example, the configuration manager 230 can include an orchestrator component that can delegate to a hardware policy manager and a component of the configuration manager 230. In addition, policy sources can retrieve current policy values of policies from the configuration manager 230, where a current policy value of a policy is a policy value that is enforced on the client device 270a to control the client device 270a.

In different implementations, the configuration manager 230 can include provisions for setting and receiving policy configuration requests from substantially any policy sources. For example, the configuration manager 230 can include a unified interface component configured to receive policy configuration requests from multiple policy sources. The unified interface component can be an interface for the policy sources to set and get policy values, for example as established by a security administrator. The unified interface component enables the configuration manager 230 to interoperate with substantially any type of policy source when reading/writing policy values for the client device 270a.

In addition, the client devices can include various internal components and systems executed by the processor of the client device 270a that work in conjunction with configuration manager 230. In some implementations, these internal systems, such as configuration processor 280, are protected environments that can similarly retrieve current policy values of the policies from the configuration manager 230. Additionally or alternatively, the configuration manager 230 can send a notification to one or more of the client device's internal system(s) in response to a change in a current policy value of a policy. Thus, the internal system(s) can receive current policy values from the configuration manager 230 and can also own and/or enforce the policies of the client device 270a. In some examples, the configuration manager 230 can send notifications to the internal system(s) responsive to policy value modifications.

Furthermore, in some implementations, various components of cloud platform 210 can have respective pre-established accounts with the configuration manager 230. An account can be a string associated with information such as, for example, server name, server address, authentication information, etc. Likewise, internal policy source components can have or be linked to pre-established accounts. Further, the policy sources can have different capabilities for setting policies depending upon policy source type. Moreover, it is contemplated that policies in the respective sets controlled by the differing policy sources can vary based on factors pertaining to the client device 270a (e.g., edition or licensing of components or systems in storage of the client device 270a, a type of the client device 270a, etc.). For example, cloud platform 210 can also include or have access to a user account information module ("customer directory service") 220, which can be maintained and managed by the cloud platform 210 in some implementations. In general, customer directory service 220 can be understood to refer to a multi-tenant cloud directory and authentication service. Thus, the customer directory service 220 provides cloud-based identity and access management services, allowing end-users of the cloud platform 210 to sign in and access resources hosted by cloud platform 210 or by the end-user's organization. One non-limiting example of such a service is Microsoft Azure Active Directory™, though other such services may also be used, including but not limited to Okta, OneLogin, JumpCloud, Idaptive Next-Gen Access, LastPass, Ping Identity, WSO2 Identity Server, Oracle Identity Management, or other such services.

During set up of a new tenant, an enterprise administrator can identify one of the clients of a tenant as a security administrator 222. In this case, a tenant is representative of an organization or a dedicated instance within the customer directory service 220. A tenant designation is generally required for defining an application and for assigning permissions so the application can make use of other cloud platform services' APIs. Accordingly, each tenant is distinct and separate from other tenants of the cloud platform 210. In different implementations, in order to configure the tamper protection system 200, the security administrator 222 for a tenant will access the configuration manager 230 (see for example FIGS. 4 and 7) and select the desired policy setting for the tamper protection feature. In response, the configuration manager 230 will call an API to be implemented by the target service. The target service is referred to in FIG. 2 as a subscription service 240 and can include any service configured to operate in conjunction with cloud platform 210 and can be connected to and communicate with the configuration manager 230. In one implementation, the subscription service 240 can include an endpoint protection platform (EPP) or other such solution that is configured for deployment on endpoint devices to prevent file-based malware, malicious scripts, and memory-based threats. The EPP can also be deployed to detect and block malicious activity from trusted and untrusted applications, and to provide the investigation and remediation capabilities needed to dynamically respond to security incidents and alerts. One non-limiting example of such a service is Microsoft Defender Advanced Threat Protection (ATP)™, although in different implementations other EPPs may be utilized.

As shown in FIG. 2, the configuration manager 230 can provide subscription service 240 with identifiers generated and maintained by customer directory service 220. For example, each tenant will be associated with one or more identifiers 232, such as but not limited to a Tenant ID (or group ID), Feature ID, and Feature Value. The subscription service 240 can then map the identifier(s) 232 to an identifier for the same tenant associated with the subscription service 240 by reference to an identification verification module ("verification module") 242. In one implementation, the verification module 242 can include an endpoint detection and response (EDR) or other such solution that is configured to monitor behaviors and attacker techniques to detect and respond to advanced attacks in real time. The EDR can record behaviors like file and process creation and network connections, and offer proactive hunting and investigation across extensive time periods of historical data. In one implementation, the verification module 242 is a subcomponent of the subscription service 240.

Figure 6:
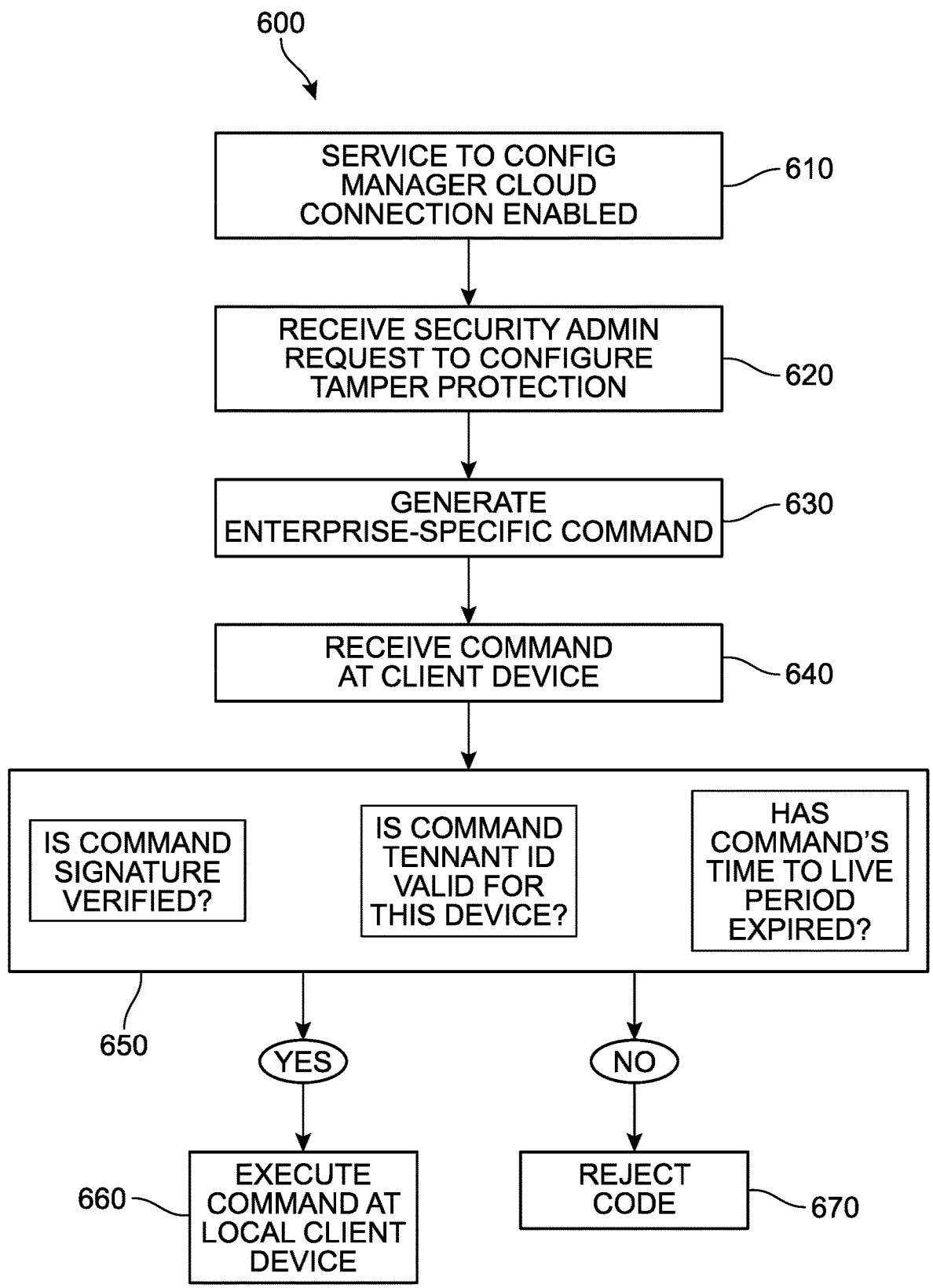
FIG. 6 is a flow diagram illustrating an implementation of a process for secure deployment of a tamper protection feature.

Once the verification module 242 confirms that the identifier(s) 232 match the corresponding identifier for the subscription service 240, the subscription service 240 will generate a data payload 252 that will be provided to the configuration manager 230. In different implementations, the data payload 252 will be accompanied or include one or more validity attributes prior to deployment from the configuration manager 230 to the client device 270a, as will be discussed in further detail with respect to FIGS. 6 and 7.

For example, the data payload 252 (also referred to herein as a command or binary) can include a digital signature corresponding to a certificate pinned to the engine for the designated subscription service. The pinned certification may be referred to as a "configuration signature," and may be securely stored at the client device 270a such that it may not be modified by users of the client device 270a, including users with administrative privileges on the client device 270a. As depicted in FIG. 2, the data payload 252 is received by a service configuration processor 282 representing the functionality of the subscription service 240 at the client device 270a. The service configuration processor 282 may further be managed by a configuration processor 280 representing the functionality of the configuration manager 230 at the client device 270a. The certificate will be loaded onto a signature viewer 292 for the subscription service at the client device 270a, where the signature viewer 292 is an aspect of an engine for a service executable 290 of the subscription service 240. The certificate thereby ensures that no changes to the policy can be made by any unauthorized user, including local admins. In addition, in some implementations, the data payload 252 can be targeted to a specific organization identifier for the subscription service 240. In such cases, the signature verifier 292 will also compare the organization identifier carried by the data payload 252 against the organization identifier in the protected registry value. Finally, in some implementations, the data payload 252 can be set to expire following a particular time frame or network hops (i.e., the data payload 252 will include a Time-To-Live (TTL)), where the command must be valid when received by the service executable 290.

If the data payload 252 is determined to be valid across each of the required validity attributes, the configuration processor 280 can distribute the command that will enable (or disable or remove) the tamper protection feature to the target client devices. In some implementations, the configuration manager 230 can support adding exclusions for specific devices, as well as provide conflict resolution in case multiple policies are targeted to the same device. For example, the configuration manager 230 can utilize various conflict resolution techniques to resolve conflicts for the policies, including an exclusive rule (e.g., when a particular value of a policy is applied then a particular value of another policy is not to be applied), an inclusive rule (e.g., set policy to value X only if another policy value falls into a range of bar), setting a policy value to X only if a specific condition of the mobile device is Y, enforcing a policy value per request from a particular policy source, setting a current value of a policy to a most recently written policy value, setting a current value of a policy to a most restrictive policy value, and/or specifying respective authority levels for policy source types.

Figure 3A:
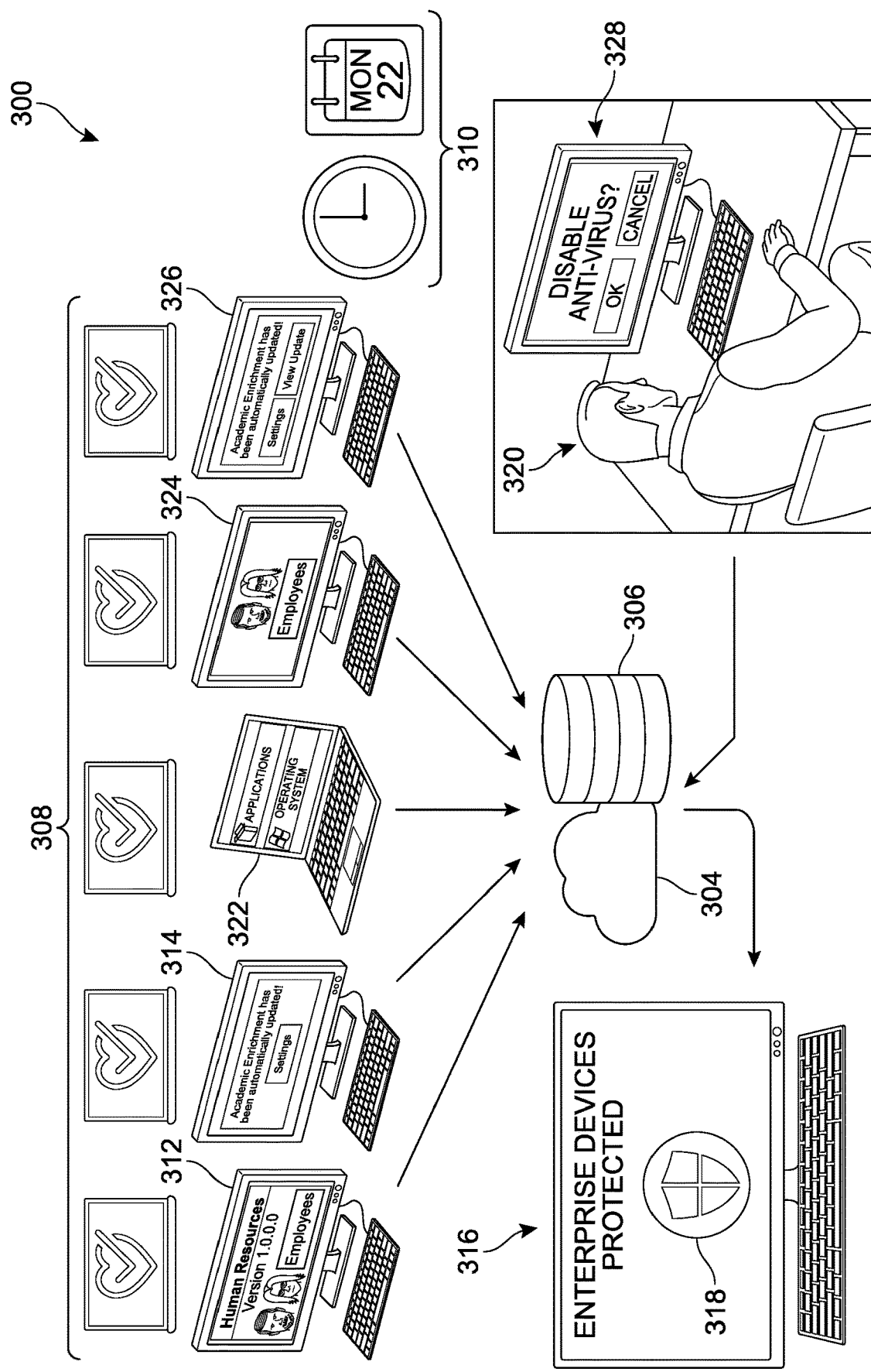
FIGS. 3A and 3B are conceptual illustrations of an implementation of the vulnerability of devices of an enterprise architecture without tamper protection.

Referring now to FIG. 3A, one example of an enterprise computing architecture ("architecture") 300 is shown. The architecture 300 may include a plurality of client devices 308 and a system administrator server ("server") 306 communicatively connected, for example via an interconnect or network 304. Client devices 308 may be any type of electronic device capable of executing programmable instructions such as, but not limited to, a mobile device, a personal digital assistant, a mobile client device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, a router, a gateway, or combination thereof.

The network 304 may be any type of communications link capable of facilitating communications between the client devices 308 and the system administrator server 306, utilizing any type of communications protocol and in any configuration, such as without limitation, a wired network, wireless network, or combination thereof. The network 104 may be a local area network (LAN), wide area network (WAN), intranet or the Internet operating in accordance with an appropriate communications protocol.

Furthermore, it can be understood that in some implementations, the client devices 308 can be in communication with the server 106 from different locations. In FIG. 3A, the client devices 308 include a first device 312, a second device 314, a third device 322, a fourth device 324, a fifth device 328, and an Nth device 326. In different implementations, two or more client devices of a single enterprise system or architecture can be associated with differing network addresses, or Nat IPs. In addition, in different implementations, the architecture 300 can include traditional client-type devices, as well as desktop computer-type devices, mobile-type devices, special purpose-type devices, embedded-type devices, and/or wearable-type devices. As an example, the client computing devices can include computer navigation type client computing devices such as satellite-based navigation systems including global positioning system (GPS) devices and other satellite-based navigation system devices, telecommunication devices such as mobile phones, tablet computers, mobile phone tablet hybrid, personal data assistants (PDAs), laptop computers, other mobile computers, wearable computers, implanted computing devices, desktop computers, personal computers, automotive computers, network-enabled televisions, thin clients, terminals, game consoles, gaming devices, work stations, media players, personal video recorders (PVRs), television set-top boxes, digital video recorders (DVRs), cameras, integrated components for inclusion in a computing device, appliances, or any other sort of computing device configured to receive user input.

Generally, a system administrator may be one or more persons responsible for maintaining and supporting the enterprise computing system 300. The system administrator may employ a server (e.g., server 306) that is communicatively coupled to the client devices 308 via the network 304. The server 306 may host some of the services that are utilized by some or all of the client devices 308. In some implementations, the system security administrator may create or receive an update deployment procedure that the system administrator may rely on during distribution of configuration updates to some or all of the client devices 308. The update deployment procedure can be configured to identify events that are to be monitored, the devices where the events may occur, and the deployment-related action that should be employed when an event occurs. Each client device may include an update service and an operating system, as well as a connection to the network 304. The update service may be embodied as a program executed by the client device, and the operating system manages the resources provided by the client device. In some implementations, one or more of these computing devices can be configured to communicate via the network 304 with a management service provider ("management service") 316 such as a type of cloud platform 210 discussed earlier with reference to FIG. 2, and transmit various telemetry signals or otherwise report conditions or a status about the computing device and its performance, operations, and/or hardware and software components.

In general, the system security administrator may establish a series of configuration settings that he or she believes will best maintain the security of the system 300. Thus, all devices of system 300 are now running anti-malware and other protective and/or critical services ("protective services") 318. However, as described earlier, without further the application of further control restrictions, the security of the enterprise may become compromised by modifications made at one or more device endpoints. As an illustration, FIG. 3A shows an enterprise device end-user ("end-user") 320 attempting to disable the anti-virus protection of fifth device 328 at a first time 310 through a registry editor for the device.

Figure 3B:
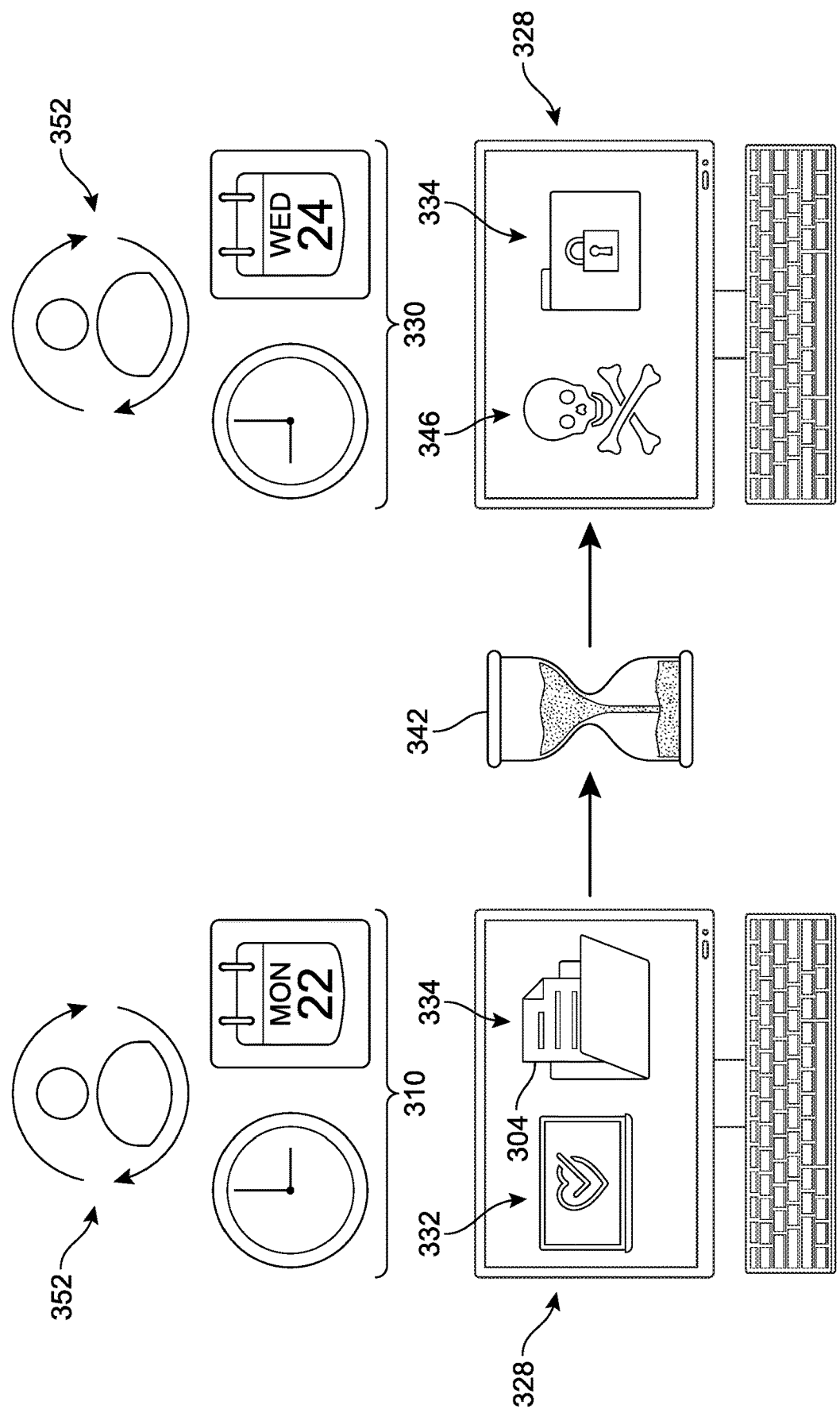

Once the protective services 318 for one device are removed, the fifth device 328 becomes a vulnerable endpoint for attacks that can affect both the fifth device 328 and the larger system 300. In FIG. 3B, this damaging process is illustrated by a depiction of the fifth device 328 at first time 310 in contrast to a later, second time 330. Up until the first time 310, device data and processes 334 for fifth device 328 are rigorously protected from threat actors 352, and no indication of malware has been detected (as represented by a healthy device icon 332). At subsequent second time 330, it can be observed that at some point during a time period 342, the fifth device 328 and/or one or more data and processes 334 have become infected with malware 326. In this scenario, for purposes of providing an example, the files are shown as being 'locked' following a ransomware attack. In other words, despite the system security administrator safeguarding the devices by applying system-wide protections, modifications made to a single device by an unwitting or otherwise uninformed end-user have introduced unwanted malware to the system.

Figure 4:
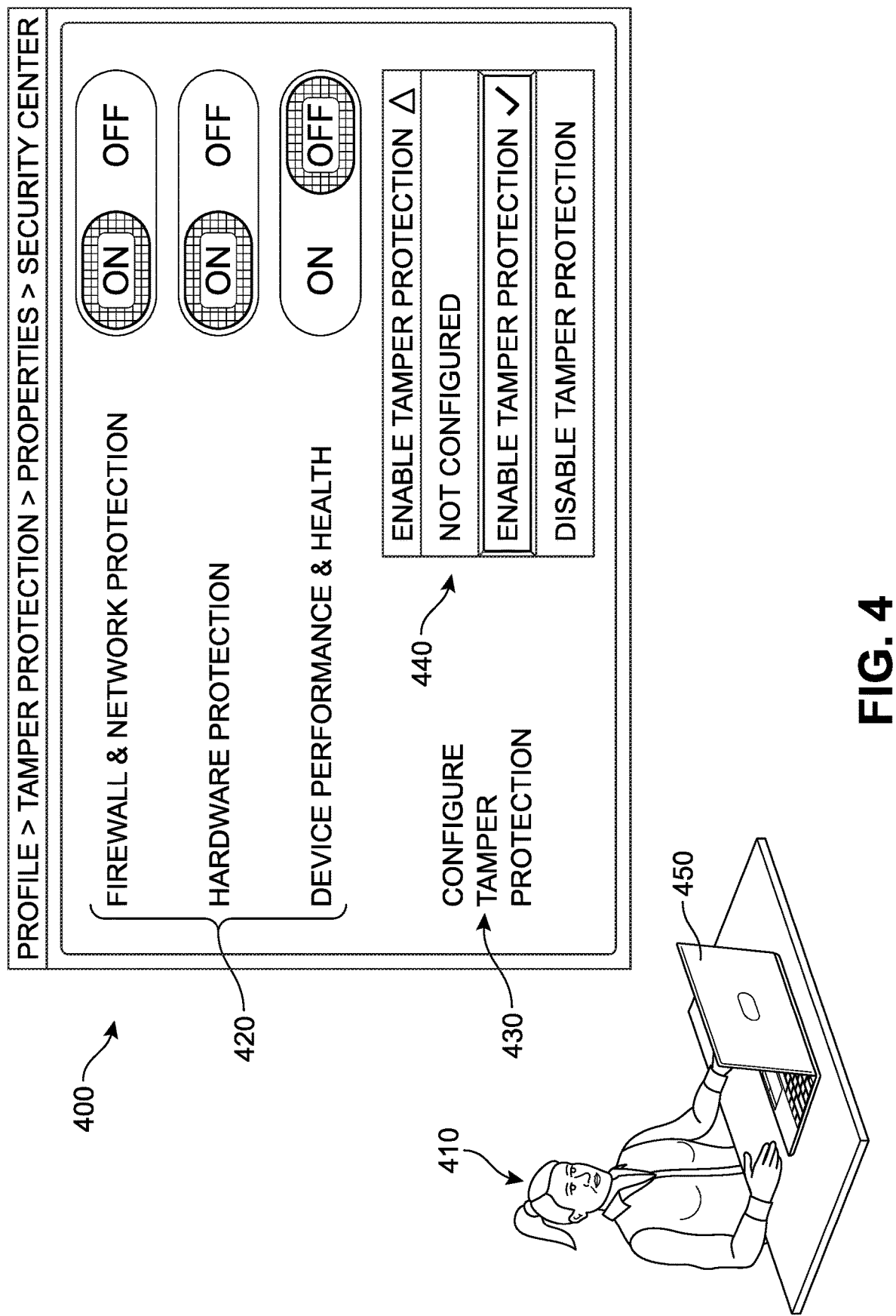
FIG. 4 is an example of a user interface for adjusting preferences for tamper protection.

In order to address these and other types of vulnerabilities that may be introduced by endpoint workarounds which end-users may use to modify system settings, the proposed systems and methods offer a stringent control mechanism by which to limit access to such settings. In FIG. 4, a system security administrator ("security admin") 410 is shown supervising and managing the application of the tamper protection feature via a feature management user interface ("user interface") 400. In general, an "interface" can be understood to refer to a mechanism for communicating content through a client application to an application user. For example, interfaces may include pop-up windows that may be presented to a user via native application user interfaces (UIs), controls, actuatable interfaces, interactive buttons, or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application. Selectable or actuatable options or buttons are configured to receive user inputs and trigger such actuation events.

In addition, a "native control" refers to a mechanism for communicating content through a client application to an application user. For example, native controls may include actuatable or selectable options or "buttons" that may be presented to a user via native application UIs, touch-screen access points, menus items, or other virtual objects that may be shown to a user through native application UIs or segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click or selection of a button or other native application object, video associated with a user interface, or other such information presentation.

The user interface 400 in FIG. 4 offers options for adjusting user preferences and providing authorization to the tamper protection feature, along with other optional settings. In this case, the user interface 400 presents a plurality of options 420 for reviewing and modifying security-based properties for an enterprise system. More specifically, tamper protection option 430 offers the security admin 410 the ability to select the desired feature state. In FIG. 4, the user interface 400 includes a drop-down menu 440 in which three possible configurations are offered, including (a) Not Configured; (b) Enable Tamper Protection; and (c) Disable Tamper Protection. Each of these configurations will be discussed in further detail with reference to FIG. 7. For purposes of this example, the security admin 410 has selected the option for enabling tamper protection. It should be understood that the options and their arrangement shown herewith are presented simply for purposes of illustration, and many other possible user preference settings or tasks are possible, including but not limited to those providing or adjusting the implementation features described herein.

Figure 5:
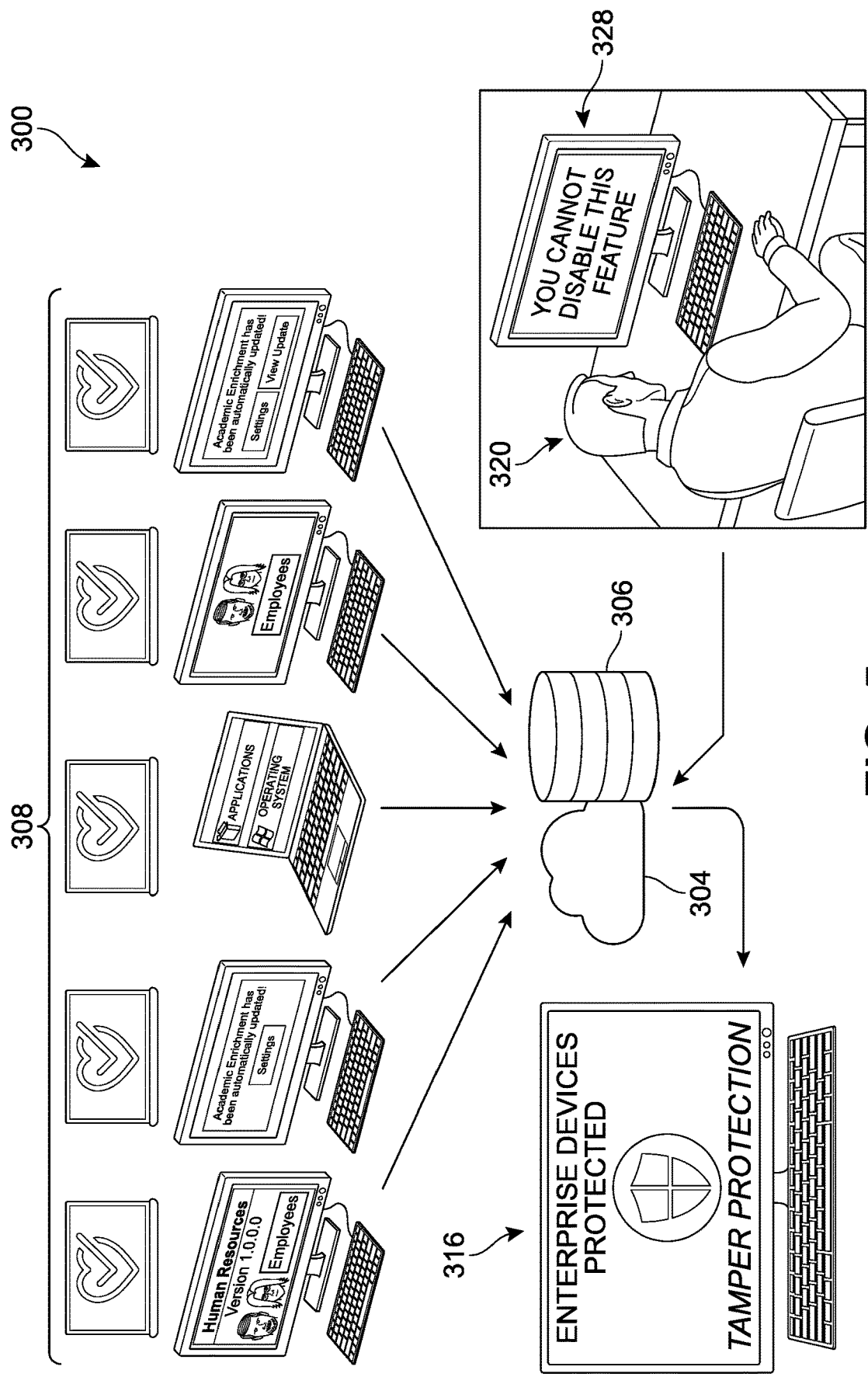
FIG. 5 is a depiction of an example of a tamper protection feature being implemented by an enterprise.

In response to this selection, the configuration manager generates a request for a signed policy command to be provided by the subscription service (see FIG. 2). In this case, the policy command will be used to configure and lock tamper protection into an "on" or enabled state. The command will be delivered by the configuration manager over the configuration service channel to the client side of the system, and the service executable at each device endpoint will interpret the policy and turn its respective tamper protection setting on. Such a scenario is illustrated in FIG. 5, where—in contrast to FIG. 3A—the end-user's 320 attempt to disable the anti-virus protection of fifth device 328 through a registry editor for the device is thwarted. The end-user 320 is unable to modify any aspect of the policy, resulting in the continued maintenance of the desired system-wide protection across the designated devices.

As discussed earlier, a critical aspect of the proposed systems and methods is the secure mechanism by which these policy commands are generated, delivered, and verified. For example, because the tamper protection policy is delivered in an encrypted state, and executed in an encrypted state, malicious actors cannot spoof or otherwise alter the selected tamper protection policy state. One example of a secure deployment process 600 is presented in FIG. 6. In this example, at a first stage 610, a connection between the configuration manager and subscription service should be available or otherwise enabled within the system. Such a connection is important to ensure that the two components are able to communicate and perform the necessary validations (see FIG. 2). In a second stage 620, the system receives a request by the tenant's security administrator to configure the tamper protection feature for some or all devices of that tenant's enterprise network. In response to this request, the system generates a policy command datagram that is specific to the targeted organization or enterprise at a third stage 630. The generated command further includes a time-to-live (TTL) value and is digitally signed.

In a fourth stage 640, the command is received by the selected client devices. At this time, the client-side systems of the client device will process the command, which also involves a verification of the command in order to authenticate its source and establish its integrity. For example, in a fifth stage 650, the client device determines whether (a) the authenticity of the digital signature can be verified; (b) the tenant ID or other identifier corresponds to the tenant of which the client is a member; and (c) the command has expired. As a general matter, the digital signature used herein refers to a verification technique that employs digital certificates, also referred to simply as certificates. In some implementations, the verification technique mathematically guarantees integrity and authenticity of the received command based on the digital signature according to an asymmetric encryption algorithm used to generate the digital signature. A certificate identifies a cryptographic key (for example, a public key of a public/private key pair employed by an asymmetric encryption algorithm) and a particular entity, associating or binding the cryptographic key to the particular entity. If a certificate is determined to be genuine by the client device, then the client device can assume that the public key identified in the certificate is associated with the particular entity identified in the certificate. A certificate may also be digitally signed by a trusted authority, which may be a certification authority. The client device typically maintains a record of one or more trusted authorities, and can verify that the certificate has not been tampered with (e.g., altered) by verifying that the certificate has been digitally signed by one of those trusted authorities. In some implementations, the client device securely stores the certificate such that it may not be modified by users of the client device, including users with administrative privileges on the client device. For example, the certificate may be maintained in a hypervisor-managed storage.

Furthermore, the command will only be executable by devices that match the designated organization or tenant identifier(s). In other words, the command payload is targeted to a specific identifier associated with the subscription service. The identifier(s) of the command are compared against the identifier(s) in the protected registry value of the client device (e.g., protected via a kernel driver). Such a mechanism ensures that the command cannot be misapplied or otherwise executed by a non-target device. In addition, the command will include a TTL that applies a designated expiry, such as 8 hours, 24 hours, 72 hours, or another defined time period. Once the prescribed event count or timespan has elapsed, the command data is discarded or must be revalidated. Thus, if a client device is disconnected from the network and only receives the command after the TTL period has expired, the system will need to reissue a 'fresh' command that has not yet expired. Such a mechanism ensures the command will only be viable for a limited duration.

If the client device determines that each of the three security mechanisms have been successfully verified, the command can be executed by the client device in a sixth stage 660 while remaining in an encrypted state. In other words, the command is not available for modification by the end-user at any point. In some implementations, the command can only be decrypted by the target feature or service that possesses a cryptographic key for decryption. If on the other hand the client device determines that any one of the three security mechanisms has failed verification, the command will be rejected in a seventh stage 670.

Figure 7:
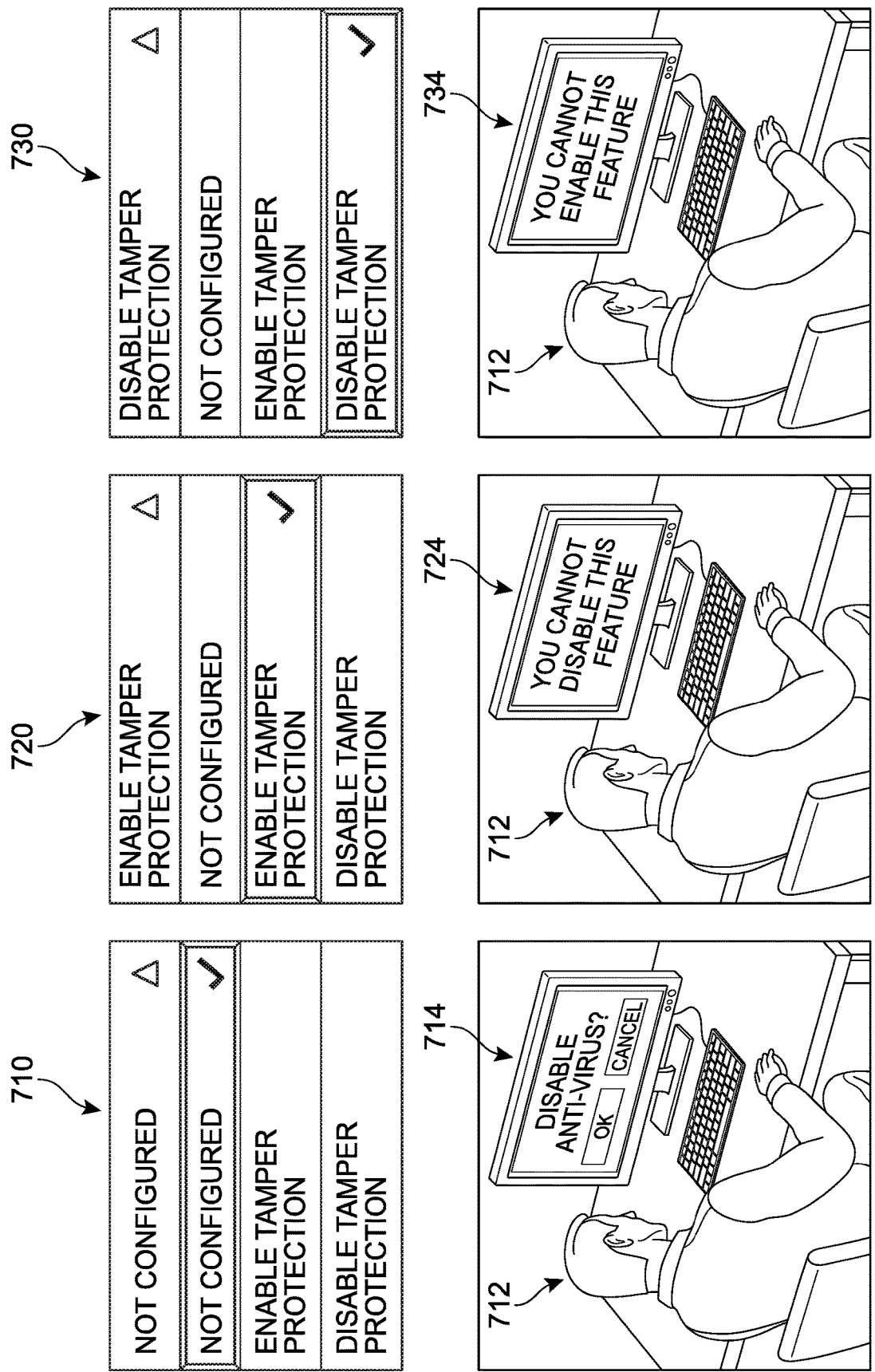
FIG. 7 depicts three possible configuration states that may be associated with the tamper protection feature.

For purposes of illustration, FIG. 7 depicts three example scenarios in which the proposed system is implemented. In most cases, the configuration setting for the tamper protection feature will be configured as "Not configured" by default, which has an effective state of disabled. In other words, a "Not configured" setting will not change the state of the setting when deployed. Thus, if the feature is currently "ON" at a client device and the "Not configured" state is deployed, the setting will remain "ON". Similarly, if the feature is currently "OFF" at a client device and the "Not configured" state is deployed, the setting will remain "OFF". For example, in a first scenario, 710, the system security administrator has either refrained from activating the feature or selected the Not Configured setting. This allows the client device(s) to continue without the additional layer of security provided by the tamper protection feature. Thus, a threat actor 712 is depicted as being able to make modifications 714 in either direction (i.e., "ON" to "OFF", or "OFF" to "ON") to the subscription service at the endpoint device.

In contrast, in a second scenario 720, the system security administrator has elected to enable the tamper protection feature, as discussed above with reference to FIG. 4. In such cases, any attempts by threat actor 712 to disable the subscription service will be associated with no change 724 in the system. Indeed, such attempts can trigger alerts or other notifications to the security administrator, as discussed below. Finally, in a third scenario 730, the system security administrator has elected to disable the tamper protection feature. In such cases, any attempts by threat actor 712 to enable the subscription service will be associated with no change 734 in the system. Such attempts can also trigger alerts or other notifications to the security administrator, as discussed below.

Although not shown here, in some implementations, the proposed systems can be monitored and/or managed at least in part by various visualization tools and dashboard-type interfaces. For example, a security administrator for a tenant may be able to access a dashboard interface that can present a plurality of status notification panels for monitoring the general progress or implementation of system-wide policy updates. In some implementations, one or more notifications or other displays of information can be presented that offer a 'big picture' sense of the established configuration policies, such as but not limited to graphical or pictorial depictions representing the policy deployment status across all tenant enterprise devices, updates that are expected or scheduled to occur, and/or information related to device compliance, where devices that do not meet one or more policy compliance conditions will be identified. The dashboard interface is thus configured to offer a simple yet comprehensive overview of each policy deployment event and/or updates cycle, empowering administrators to readily identify and locate issues, recurring problems, patterns, and facilitate troubleshooting and device compliance awareness.

Similarly, in some other implementations, the system can be configured to detect attempts to modify the tamper protection feature by an unauthorized user or other malicious application. In some cases, in response to a detection of such an attempt, the client device can cause a notification to be generated for the security administrator's review. These notifications can be automated, and may be transmitted per system settings and/or security admin preferences, including but not limited to e-mail messages, text messages, chat messages, pop-up windows, automated phone calls, any other form of communication associated with the user's account may be used to provide such information. For example, the system may be configured to detect instances in which a threat attack is directed to the tamper protection feature, an attempt to alter the configuration via registry or other settings is made, or an endpoint device has determined that a command is expired, is associated with an inappropriate tenant identifier, and/or has a signature that cannot be verified.

It should be understood that the disclosed process and system can be applicable to both enterprise environments, which typically include network administrators and other information technology workers, as well as consumer-level entities that are frequently the targets of malware attacks on their personal computing devices. These automated processes allow individuals to feel confident that malware attacks are being dealt with appropriately, even in the absence of network supervisors.

Figure 8:
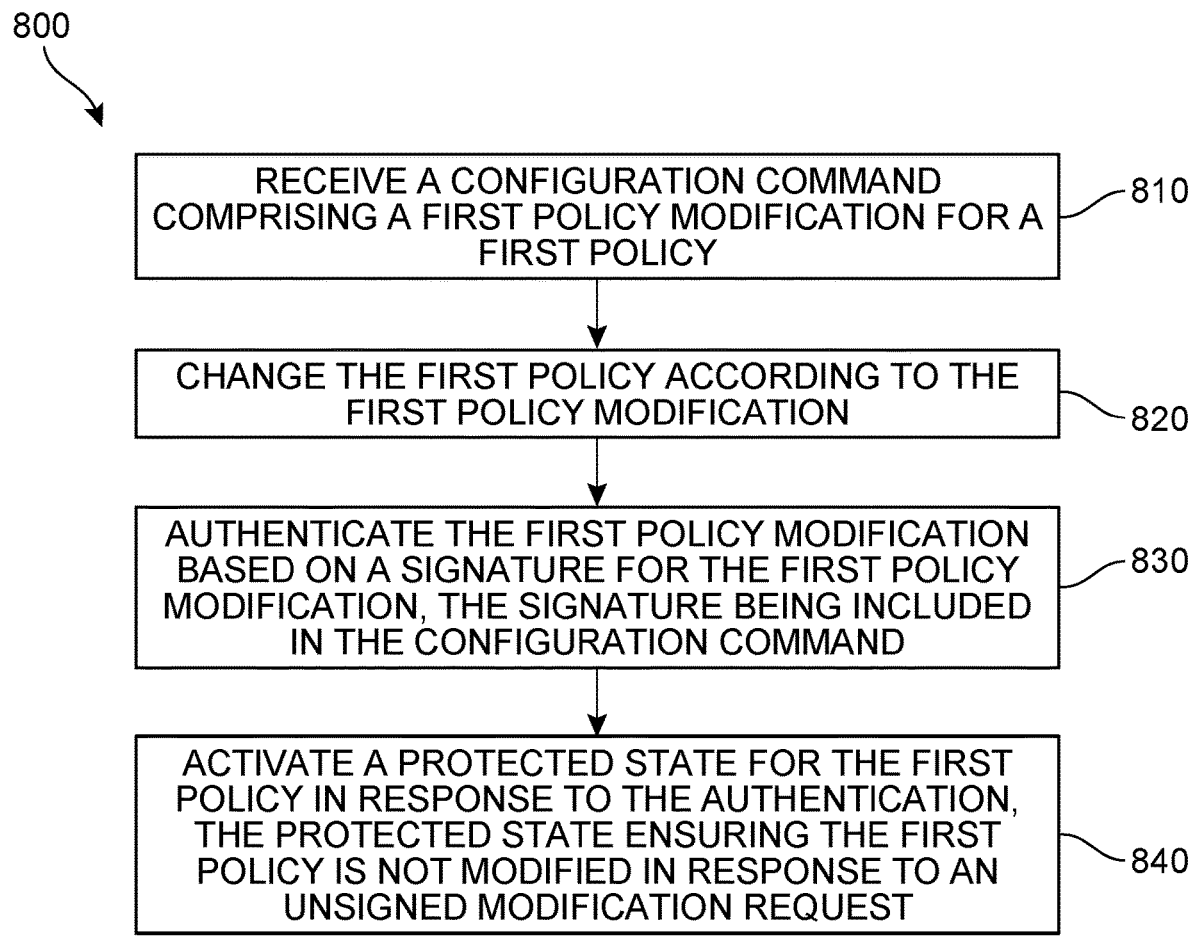
FIG. 8 is a flow chart presenting an implementation of a tamper protection deployment process.

FIG. 8 is a flow chart illustrating an implementation of a method 800 of deploying a tamper protection policy modification to one or more target devices. In the example of FIG. 8, a first step 810 includes receiving a configuration command comprising a first policy modification for a first policy, and a second step 820 includes changing the first policy according to the first policy modification. In addition, a third step 830 includes authenticating the first policy modification based on a signature for the first policy modification, the signature being included in the configuration command. Finally, a fourth step 840 includes activating a protected state for the first policy in response to the authentication, the protected state ensuring the first policy is not modified in response to an unsigned modification request.

In other implementations, additional steps may be included. For example, in some implementations, the first policy controls operation of a security component executing on the target device. In another example, the authentication step is performed within a protected environment on the target device. In some implementations, the method also includes verifying that a first tenant identifier included in the configuration command matches an assigned tenant identifier of the target device. In one implementation, the method further includes a step of verifying that a time-to-live value for the configuration command has not expired. In one example, the authentication of the first policy modification includes mathematically guaranteeing integrity and authenticity of the received configuration command based on the digital signature according to an asymmetric encryption algorithm used to generate the digital signature. In some implementations, the method also includes securely storing a configuration signature at the target device to ensure that the configuration signature is not tampered with by a user with administrative privileges on the target device, and the authentication of the first policy modification is based on the securely stored configuration signature.

Other methods may be contemplated within the scope of the present disclosure. For example, in some embodiments, a method of deploying a tamper protection policy modification includes a first step of receiving, a user request for modifying a policy of at least a first target device, and a second step of obtaining a bit string encoding a policy modification. The method may further include a third step of obtaining a digital signature generated for the bit string. A fifth step may involve encoding the bit string and digital signature in a configuration command for the first target device, the configuration command instructing the first target device to modify the policy and protect the modified policy from unsigned modification requests. In addition, the method can include a sixth step of issuing the configuration command to the first target device.

In other implementations, additional steps may be included. For example, in some implementations, the method also includes receiving the digital signature from an endpoint protection service platform associated with the policy. In some cases, the user request identifies a group of target devices including the first target device, and the method then further includes issuing the configuration command with the same signature to each target device identified in the group of target devices. In one example, the bit string includes a group identifier corresponding to the group of target devices.

In another implementation, the method can also include obtaining a first time-to-live value for inclusion in the configuration command prior to issuing the configuration command to the first target device. In such cases, the method may further include step of determining that the first time-to-live value expired prior to receipt of the configuration command by the first target device, obtaining, in response to determining that the first time-to-live value expired, a second time-to-live value, and then re-issuing the configuration command to the first target device with the second time-to-live value.

In some implementations, deployment of the policy is managed by one of a mobile device management (MDM) protocol and an Open Mobile Alliance-Device Management (OMA-DM) protocol. In another example, the method may also include receiving, from the first target device, confirmation that the configuration command was executed at the first target device. In such cases, the method may further include generating and transmitting a notification message to a security administrator associated with the target device (i.e., the account that had submitted the user request) confirming the configuration command was executed by the first target device.

As discussed herein, the ability to provide users a mechanism by which to ensure that particular device policy settings are protected from threat actors can be a critical aspect of system security. By preventing situations that can lead to potential data damage, the tamper protection feature offers system administrators peace of mind. Through the use of this system, users can continue to access and modify other settings while being locked out of critical system settings as designated by the administrator. The tamper protection policy is delivered in an encrypted state, and executed in an encrypted state, thereby blocking malicious actors from spoofing or otherwise affecting the selected tamper protection policy state.

The detailed examples of systems, devices, and techniques described in connection with FIGS. 1-8 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 9:
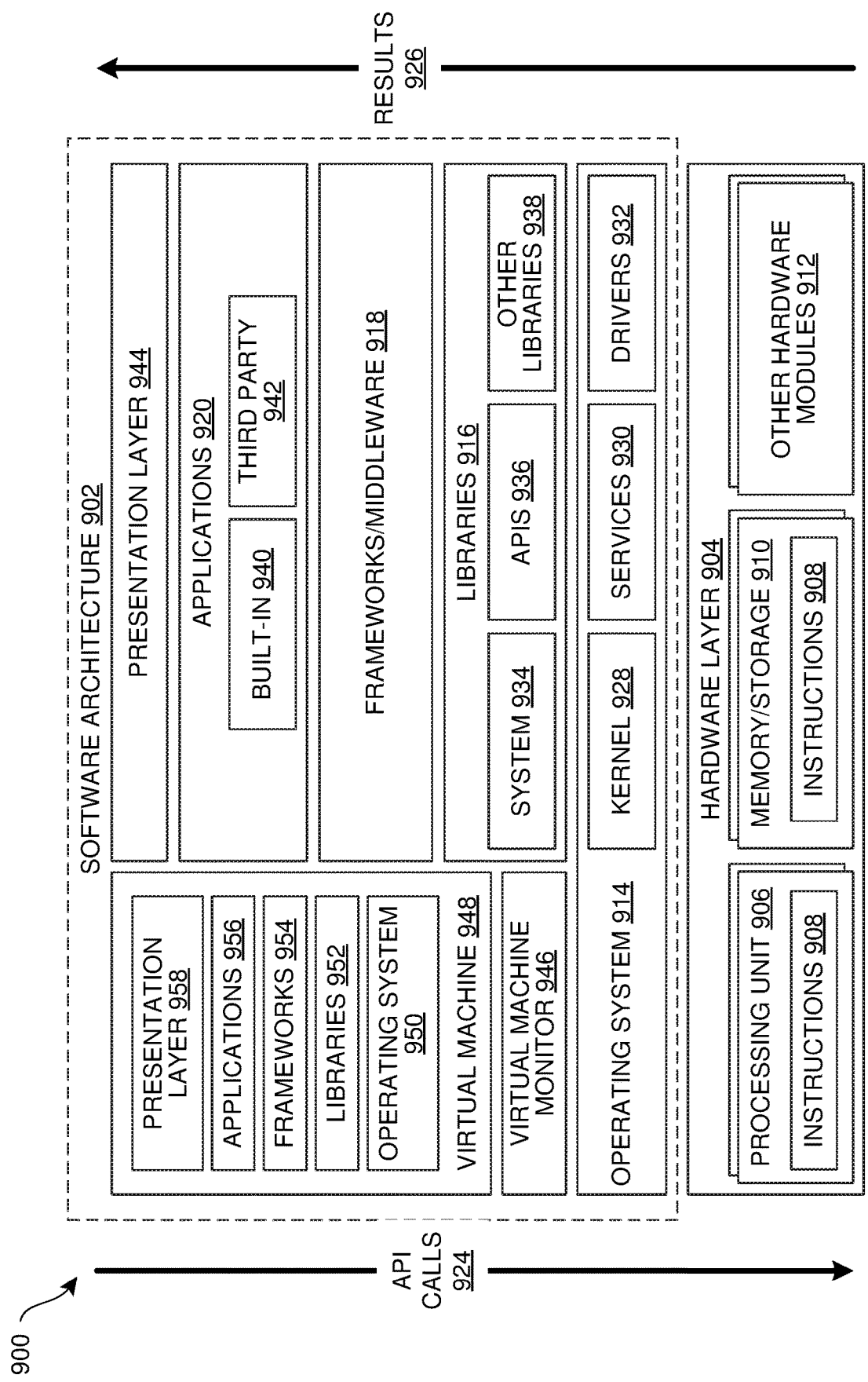
FIG. 9 is a block diagram illustrating an example software architecture, various portions of which may be used in conjunction with various hardware architectures herein described, which may implement any of the features herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as the devices of FIG. 2 that includes, among other things, document storage 970, processors, memory, and input/output (I/O) components. A representative hardware layer 904 is illustrated and can represent, for example, the devices of FIG. 2. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 900 of FIG. 9, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 10:
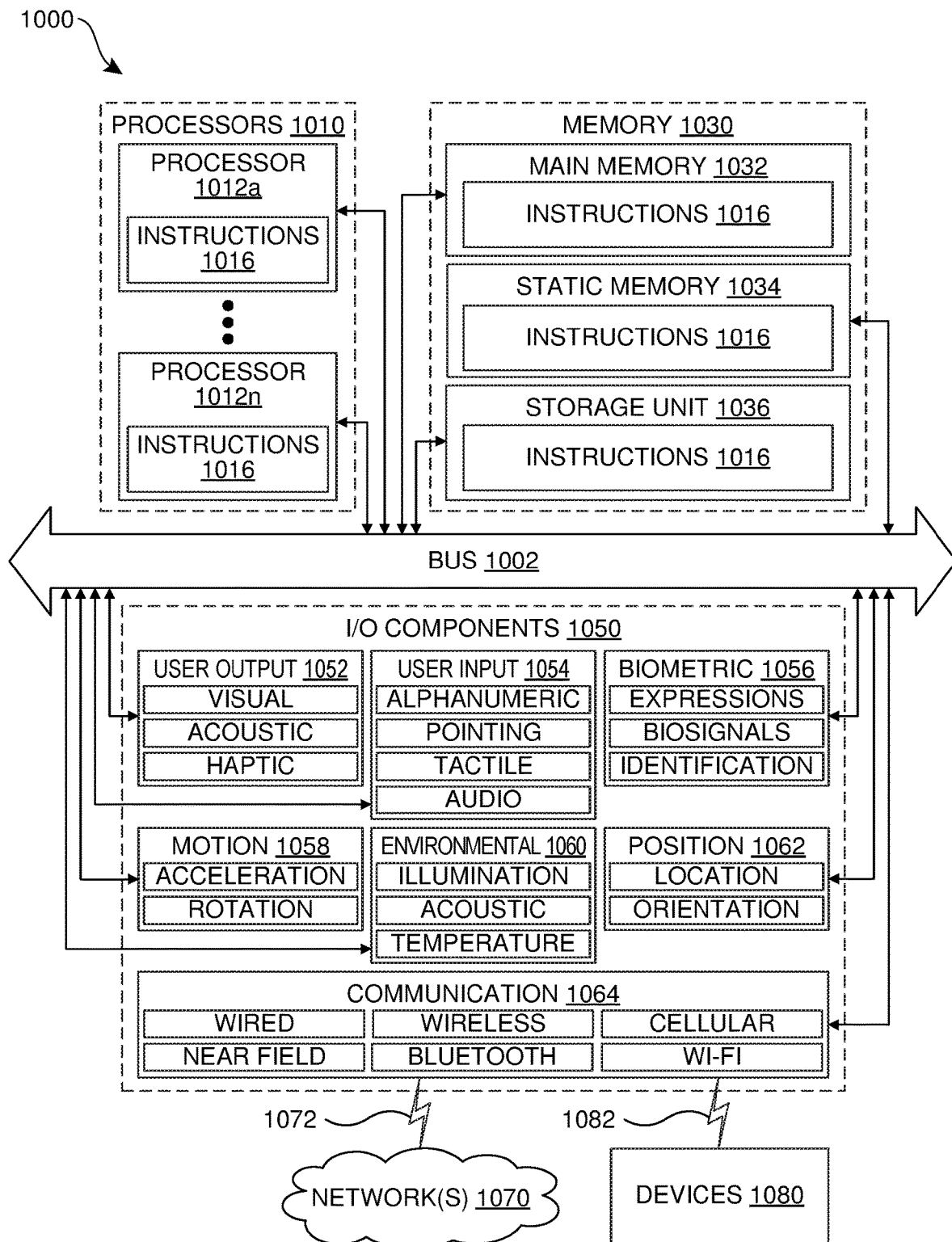
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" include a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056 and/or position components 1062, among a wide array of other environmental sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Pat. No. 7,181,531 (issued on Feb. 20, 2007 and entitled "Method to synchronize and upload an offloaded network stack connection with a network stack") and U.S. Pat. No. 8,627,475 (issued on Jan. 7, 2014 and entitled "Early detection of potential malware"); and U.S. Patent Application Publication Numbers 2008/0005188 (published on Jan. 3, 2008 and entitled "Content Synchronization in a File Sharing Environment"), 2013/0160126 (published on Jun. 20, 2013 and entitled "Malware remediation system and method for modern applications"), 2018/0341529 (published on Nov. 29, 2018 and entitled "Hypervisor-Based Secure Container"), and 2019/0182295 (published on Jun. 13, 2019 and entitled "Distribution and Management of Services in Virtual Environments"), the disclosures of which are each herein incorporated by reference in their entirety.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method performed by a client device for modifying a tamper protection policy, comprising:
   receiving a configuration command comprising a policy modification for a tamper protection policy and a digital signature certifying integrity and authenticity of the policy modification, the tamper protection policy defining a set of security protection settings of the client device;
   modifying the tamper protection policy according to the policy modification;
   authenticating the policy modification based on the digital signature; and
   in response to authenticating the policy modification, activating a protected state for the modified tamper protection policy, wherein, upon activating the protected state, the client device is controlled to protect the modified tamper protection policy from an unauthenticated policy modification.

2. The method of claim 1, wherein the tamper protection policy controls operation of a security component executing on the client device.

3. The method of claim 1, wherein the policy modification is authenticated within a protected environment on the client device.

4. The method of claim 1, further comprising verifying that a first tenant identifier included in the configuration command matches an assigned tenant identifier of the client device.

5. The method of claim 1, further comprising verifying that a time-to-live value for the configuration command has not expired.

6. The method of claim 1, wherein the digital signature is generated using an asymmetric encryption algorithm.

7. The method of claim 1, further comprising securely storing a configuration signature to ensure that the configuration signature is not tampered with by a user with administrative privileges on the client device,
   wherein the authentication of the policy modification is based on the securely stored configuration signature.

8. A client device for modifying a tamper protection policy, comprising:
   a processor; and
   a computer-readable medium in communication with the processor and storing instructions that, when executed by the processor, cause the processor to control the client device to perform:
      receiving a configuration command comprising a policy modification for a tamper protection policy and a digital signature certifying integrity and authenticity of the policy modification, the tamper protection policy defining a set of security protection settings of the client device;
      modifying the tamper protection policy according to the policy modification;
      authenticating the policy modification based on the digital signature; and
      in response to authenticating the policy modification, activating a protected state for the modified tamper protection policy, wherein, upon activating the protected state, the client device is controlled to protect the modified tamper protection policy from an unauthenticated policy modification.

9. The client device of claim 8, wherein the tamper protection policy controls operation of a security component executing on the client device.

10. The client device of claim 8, wherein the policy modification is authenticated within a protected environment on the client device.

11. The client device of claim 8, wherein the instructions, when executed by the processor, further cause the processor to control the client device to perform verifying that a first tenant identifier included in the configuration command matches an assigned tenant identifier of the client device.

12. The client device of claim 8, wherein the instructions, when executed by the processor, further cause the processor to control the client device to perform verifying that a time-to-live value for the configuration command has not expired.

13. The client device of claim 8, wherein the digital signature is generated using an asymmetric encryption algorithm.

14. The client device of claim 8, wherein:

the instructions, when executed by the processor, further cause the processor to control the client device to perform securely storing a configuration signature to ensure that the configuration signature is not tampered with by a user with administrative privileges on the client device, and the authentication of the policy modification is based on the securely stored configuration signature.

15. A non-transitory computer-readable medium comprising instructions that, when executed by a processor, cause the processor to control a client device to perform:

receiving a configuration command comprising a policy modification for a tamper protection policy and a digital signature certifying integrity and authenticity of the policy modification, the tamper protection policy defining a set of security protection settings of the client device;

modifying the tamper protection policy according to the policy modification;

authenticating the policy modification based on the digital signature; and in response to authenticating the policy modification, activating a protected state for the modified tamper protection policy, wherein, upon activating the protected state, the client device is controlled to protect the modified tamper protection policy from an unauthenticated policy modification.

16. The non-transitory computer-readable medium of claim 15, wherein the tamper protection policy controls operation of a security component executing on the client device.

17. The non-transitory computer-readable medium of claim 15, wherein the policy modification is authenticated within a protected environment on the client device.

18. The non-transitory computer-readable medium of claim 15, wherein the instructions, when executed by the processor, further cause the processor to control the client device to perform verifying that a first tenant identifier included in the configuration command matches an assigned tenant identifier of the client device.

19. The non-transitory computer-readable medium of claim 15, wherein the instructions, when executed by the processor, further cause the processor to control the client device to perform verifying that a time-to-live value for the configuration command has not expired.

20. The non-transitory computer-readable medium of claim 15, wherein:

the instructions, when executed by the processor, further cause the processor to control the client device to perform securely storing a configuration signature to ensure that the configuration signature is not tampered with by a user with administrative privileges on the client device, and the authentication of the policy modification is based on the securely stored configuration signature.

* * * * *